United States Patent
Maleki et al.

(10) Patent No.: US 10,567,729 B2
(45) Date of Patent: Feb. 18, 2020

(54) USER INTERFACE FOR ADJUSTMENT OF STEREOSCOPIC IMAGE PARAMETERS

(71) Applicant: BitAnimate, Inc., Lake Oswego, OR (US)

(72) Inventors: Behrooz Maleki, West Linn, OR (US); Sarvenaz Sarkhosh, West Linn, OR (US)

(73) Assignee: BITANIMATE, INC., Lake Oswego, OR (US)

( * ) Notice: Subject to any disclaimer, the term of this patent is extended or adjusted under 35 U.S.C. 154(b) by 47 days.

(21) Appl. No.: 15/675,601

(22) Filed: Aug. 11, 2017

(65) Prior Publication Data

US 2019/0052857 A1    Feb. 14, 2019

(51) Int. Cl.
| | | |
|---|---|---|
| H04N 13/00 | (2018.01) | |
| H04N 13/122 | (2018.01) | |
| H04N 13/139 | (2018.01) | |
| G06F 3/0484 | (2013.01) | |

(52) U.S. Cl.
CPC ....... H04N 13/122 (2018.05); G06F 3/04845 (2013.01); H04N 13/139 (2018.05)

(58) Field of Classification Search
CPC ... G06T 15/005; G06T 15/205; G06T 19/003; G06T 19/006; H04N 13/261; H04N 13/275; H04N 5/23238; H04N 13/122; H04N 13/139; G06F 3/04845
See application file for complete search history.

(56) References Cited

U.S. PATENT DOCUMENTS

| | | | |
|---|---|---|---|
| 7,933,395 B1 | | 4/2011 | Bailly et al. |
| 9,778,741 B2 * | | 10/2017 | Smoot .................. G06T 19/006 |
| 2008/0226181 A1 | | 9/2008 | Birtwistle et al. |
| 2011/0157155 A1 | | 6/2011 | Turner et al. |
| 2012/0041722 A1 | | 2/2012 | Quan et al. |
| 2012/0300034 A1 * | | 11/2012 | Atanassov ........... H04N 13/398 348/46 |
| 2013/0120534 A1 * | | 5/2013 | Sakamoto ............. G06T 3/0006 348/46 |
| 2013/0147928 A1 * | | 6/2013 | Woo .................... H04N 13/0014 348/51 |
| 2014/0129990 A1 * | | 5/2014 | Xin ......................... G06F 3/017 715/849 |
| 2017/0142404 A1 | | 5/2017 | Maleki et al. |

OTHER PUBLICATIONS

International Search Report dated Dec. 14, 2018 as received in Application No. PCT/US2018/055190.
Written Opinion of the International Searching Authority dated Dec. 14, 2018 as received in Application No. PCT/US2018/055190.

* cited by examiner

*Primary Examiner* — Yon J Couso
(74) *Attorney, Agent, or Firm* — Maschoff Brennan

(57) ABSTRACT

According to an aspect of an embodiment, a method may include receiving, at a first interface element of a user interface, a first user input regarding a degree of stereoscopic depth rendered in a stereoscopic image. The method may also include adjusting the stereoscopic depth based on the first user input. Additionally, the method may include receiving, at a second interface element of the user interface, a second user input regarding adjustment of a z-plane position of the stereoscopic image and adjusting the z-plane position based on the second user input. The method may further include generating the stereoscopic image based on the adjustment of the stereoscopic depth and the adjustment of the z-plan position.

20 Claims, 11 Drawing Sheets

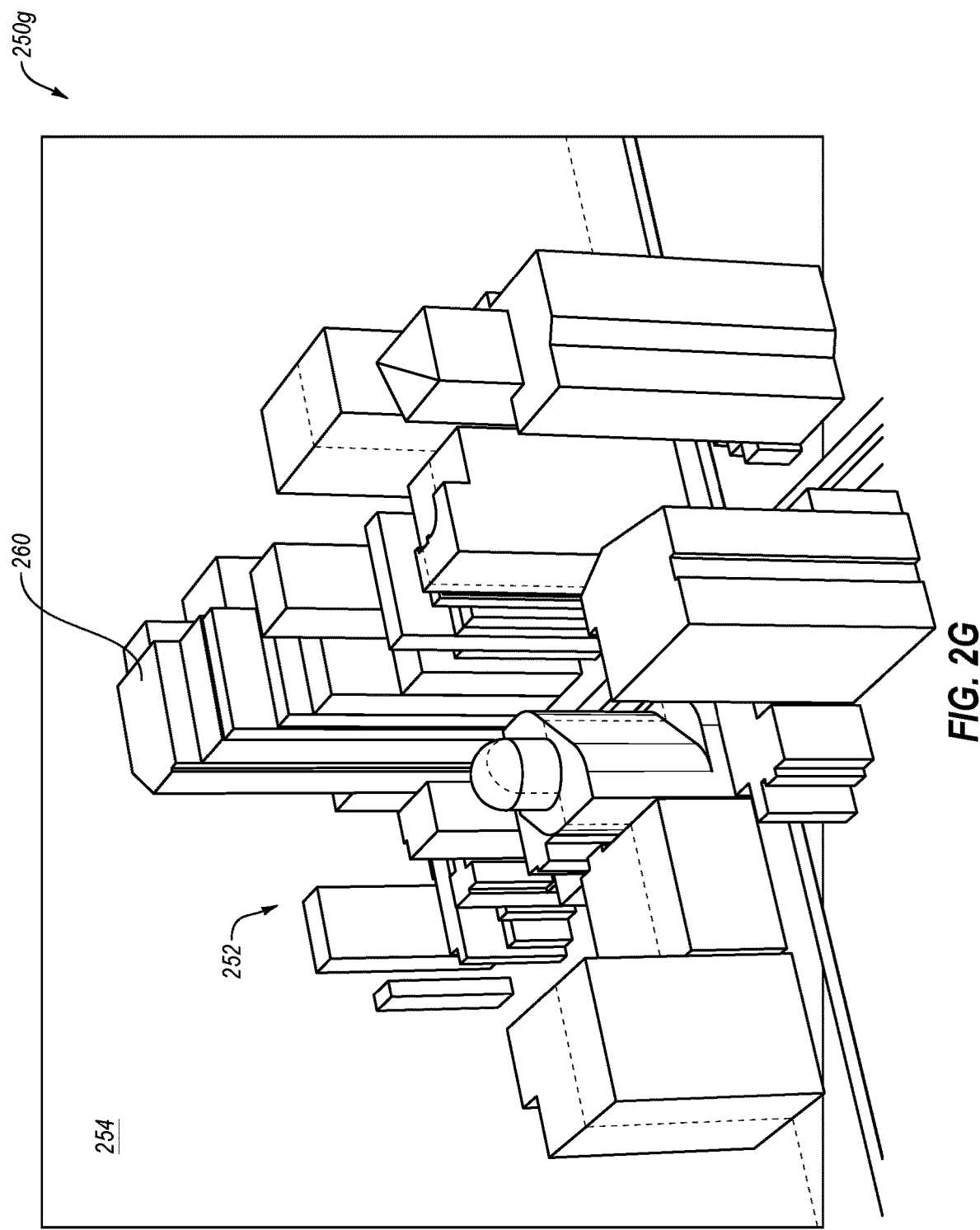

USER INTERFACE FOR ADJUSTMENT OF STEREOSCOPIC IMAGE PARAMETERS

FIELD

The present disclosure relates to a user interface for adjustment of stereoscopic image parameters.

BRIEF DESCRIPTION OF THE DRAWINGS

Example embodiments will be described and explained with additional specificity and detail through the use of the accompanying drawings in which:

FIG. 2G illustrates a stereoscopic depiction of the setting of FIG. 2A that corresponds to a seventh stereoscopic image and that is displayed on a display screen;

Figure 1:
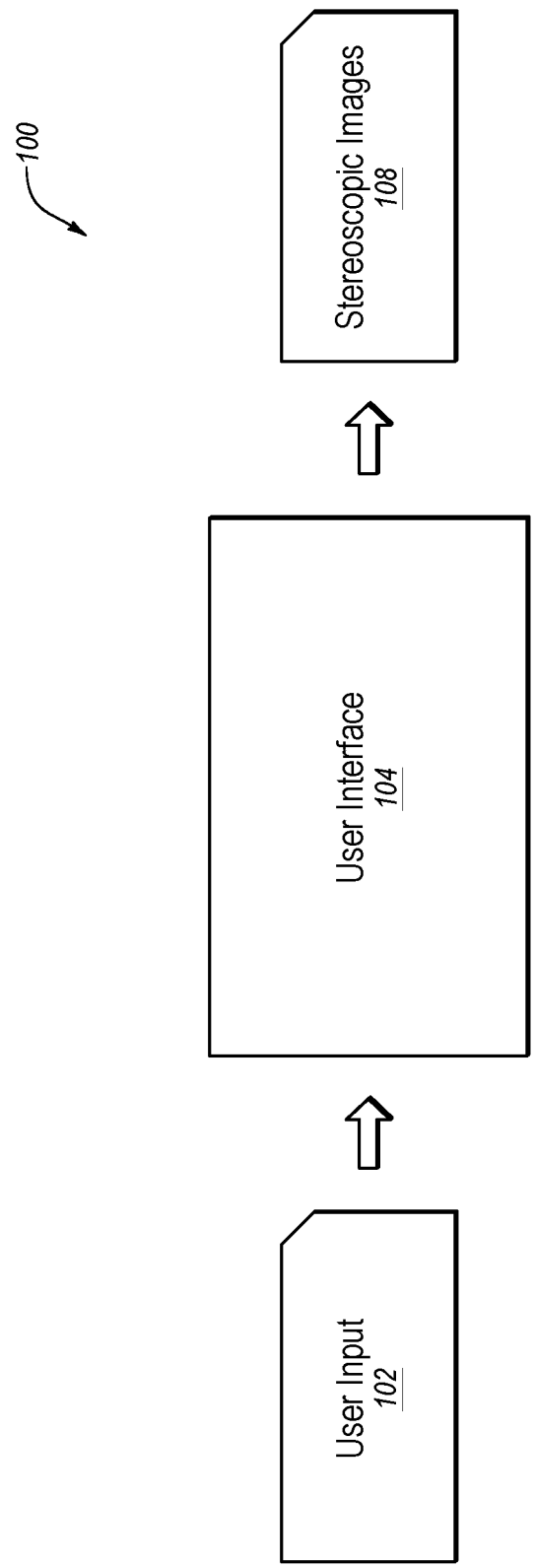
FIG. 1 illustrates an example system that includes a user interface configured to set one or more parameters of stereoscopic images based on user input.

all arranged in accordance with at least some embodiments described in the present disclosure.

SUMMARY

According to an aspect of an embodiment, a method may include receiving, at a first interface element of a user interface, a first user input regarding a degree of stereoscopic depth rendered in a stereoscopic image. The method may also include adjusting the stereoscopic depth based on the first user input. Additionally, the method may include receiving, at a second interface element of the user interface, a second user input regarding adjustment of a z-plane position of the stereoscopic image and adjusting the z-plane position based on the second user input. The method may further include generating the stereoscopic image based on the adjustment of the stereoscopic depth and the adjustment of the z-plan position.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

DESCRIPTION OF EMBODIMENTS

Humans have a binocular vision system that uses two eyes spaced approximately two and a half inches (approximately 6.5 centimeters) apart. Each eye sees the world from a slightly different perspective. The brain uses the difference in these perspectives to calculate or gauge distance. This binocular vision system is partly responsible for the ability to determine with relatively good accuracy the distance of an object. The relative distance of multiple objects in a field-of-view may also be determined with the help of binocular vision.

Three-dimensional (stereoscopic) imaging takes advantage of the depth perceived by binocular vision by presenting two images to a viewer where one image is presented to one eye (e.g., the left eye) and the other image is presented to the other eye (e.g., the right eye). The images presented to the two eyes may include substantially the same elements, but the elements in the two images may be offset from each other to mimic the offsetting perspective that may be perceived by the viewer's eyes in everyday life. Therefore, the viewer may perceive depth in the elements depicted by the images.

According to one or more embodiments of the present disclosure, a user-interface may be generated and configured to allow for the adjustment by users of stereoscopic images. For example, in some embodiments, and as detailed below the user-interface may be configured to receive user input regarding one or more of the following features: a degree of stereoscopic depth rendered in a stereoscopic image, a position of a z-plane position of the stereoscopic image, a size of field of view of a setting depicted in the stereoscopic image, a pitch of a depiction of the setting, a distance of a point of view from which the setting is depicted, and a scaling of objects in the setting as depicted in the stereoscopic image. Reference to a "stereoscopic image" in the present disclosure may refer to any configuration of right eye and left eye images that when viewed by their respective eyes may generate a 3D effect as perceived by a viewer.

In some embodiments, the user-interface may be used with a mapping application in which the stereoscopic images may depict a geographic setting. In these or other embodiments, the user interface may include one or more other elements related to adjustment of features related to the mapping application such as adjustment of a speed of a simulation of following a navigation route, allowing for a flight simulation mode that allows for simulation of flying through the geographic setting, allowing for toggling between a map mode or an air image mode in which while in the map mode, the stereoscopic images depict the geographic setting in a drawn map and in which while in the air image mode the geographic setting is depicted based on (e.g., to include at least a portion of) one or more images of the geographic setting as captured by a camera. In the present disclosure, reference to a mapping application may include software, hardware, or any combination thereof that may be used to depict a geographic setting. These mapping applications may be included in or accessible via various devices or navigation systems such as desktop computers, smartphones, tablet computers, automobile navigation systems, Global Positioning System (GPS) navigation devices, etc. Examples of mapping applications include Google Maps®, Google Earth®, Bing Maps®, etc.

By allowing users to adjust the stereoscopic images, the technological area of stereoscopic image presentation and generation may be improved. For example, different individuals have different physical characteristics that dictate their ability to view or a comfort level of viewing stereoscopic images. As such, a stereoscopic image with a particular set of parameters that may be comfortably viewed by one person may not be comfortably viewed by another person. Therefore, by enabling users to adjust one or more parameters of a stereoscopic image, the user interface may allow users to make adjustments unique to them such that the stereoscopic image may be more easily or more comfortably viewed.

Additionally or alternatively, in instances in which the user-interface is implemented with mapping applications, the mapping applications may be improved by the user-interface for better customization and configuration of stereoscopic images. Additionally, the adjustment of the stereoscopic images may improve the safety of such mapping applications that may be used during operation of a vehicle by enabling users to implement settings according to the users' individual characteristics or needs to ease the use of such systems and applications in a manner that reduces or minimizes distractions while operating the vehicle.

FIG. 1 illustrates an example system 100 that includes a user interface 104 configured to set one or more parameters of stereoscopic images based on user input 102, according to some embodiments of the present disclosure. The user interface 104 may also be configured to direct the generation of one or more stereoscopic images 108 based on the parameters as indicated by the user input 102.

In some embodiments, the user interface 104 may be included with any suitable system configured to generate and display the stereoscopic images 108. For example, in some embodiments, the user interface 104 may be included with a mapping application that may be configured to generate stereoscopic images of a geographic setting. In these or other embodiments, the user interface 104 may be configured to interface with a display module of a device such that the stereoscopic images 108 may be presented on a corresponding display to render the 3D effect according to the parameters entered in the user interface 104. The stereoscopic images 108 may be presented on the display according to the particular requirements of the display and display module.

Figure 3:
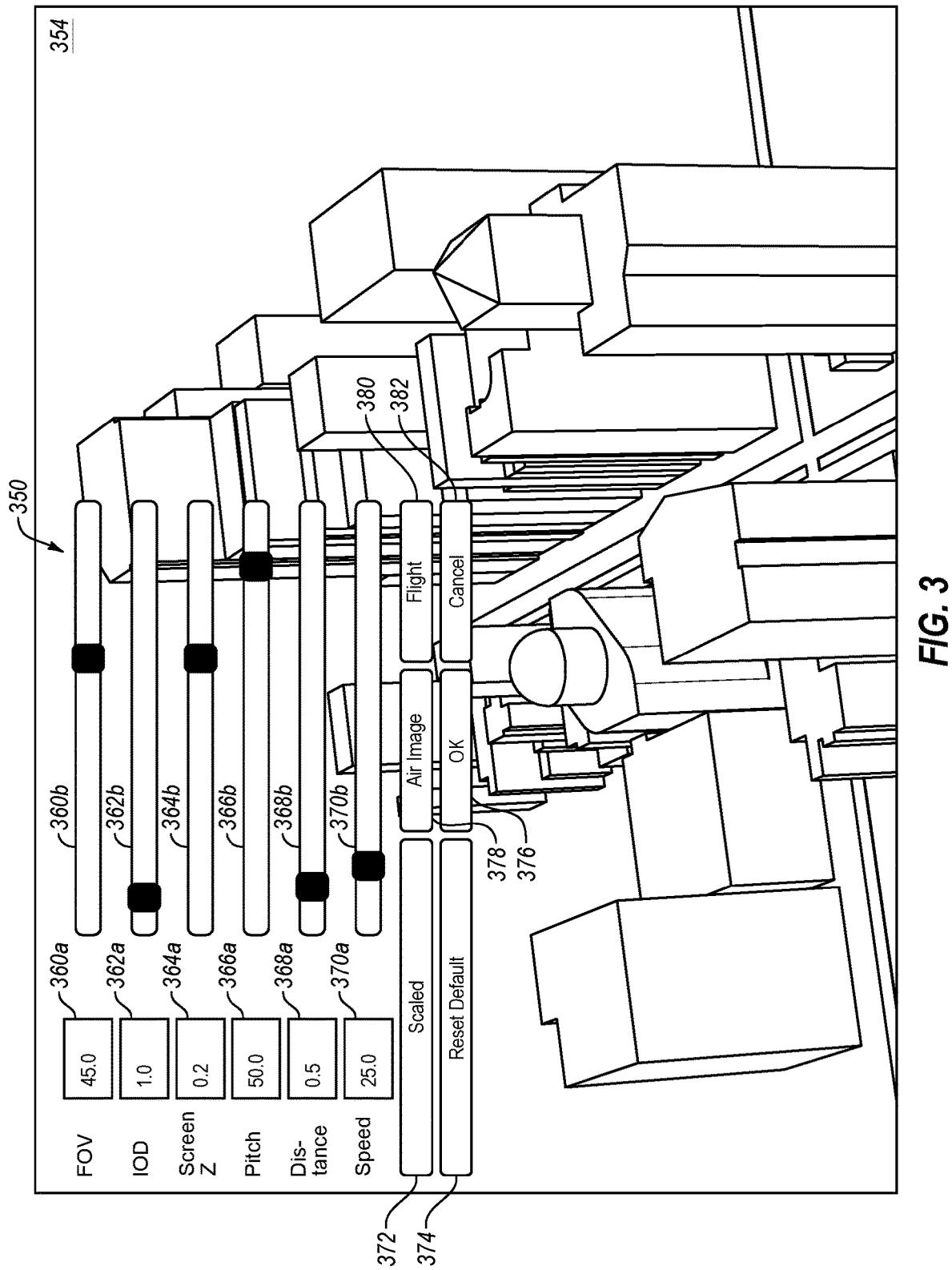
FIG. 3 illustrates an example visual depiction of a user interface configured to control adjustment of a stereoscopic image.

In some embodiments, the user interface 104 may include software that includes computer-executable instructions, which in response to being executed by one or more processors, cause operations that may include: presenting the user interface 104, obtaining the user input 102, and directing the generation of the stereoscopic images 108 based on the user input 102. In some embodiments, the user interface 104 may be configured as a graphical user interface (GUI). FIG. 3 includes an example visual presentation of a user interface 304 that may be an example of the user interface 104 and that is described in further detail below. In the present disclosure, reference to a user interface is not limited to merely what is presented by a screen but may also include software and/or hardware configured to generate the user interface and direct the performance of operations based on user interactions with the user interface.

The user interface 104 may include one or more interface elements that may be manipulated (e.g., populated, configured, adjusted, etc.) based on the user input 102. For example, the interface elements may include fields that may be populated based on the user input 102, buttons that may be selected according to the user input 102, slide bars that may be moved according to the user input 102, or any other applicable object that may be manipulated based on the user input 102.

In some embodiments, the user input 102 may include any suitable command or input that may be derived from a user. Additionally or alternatively, the user input 102 may be derived via a user interaction with any suitable input device. For example, the input device may include a keyboard, a mouse, a joystick, a gaming controller, a touchscreen, a remote control, a microphone, a camera, etc. The input device may be configured to communicate and interface with the user interface 104 such that the user interface 104 may receive the user input 102 based on the user interaction with the input device.

The user interface 104 may be configured to direct the generation of the stereoscopic images 108 based on the user input 102. For example, in some embodiments, the user interface 104 may include one or more interface elements configured to allow a user to provide input regarding one or more parameters of the stereoscopic images 108. The interface elements may also be configured to direct the adjustment of the corresponding parameters according to the corresponding user input such that the stereoscopic images 108 are generated according to the adjusted parameters. In the present disclosure, reference to an interface element directing operations (e.g., directing adjustment of a stereoscopic image parameter) may include any applicable software, hardware, instructions, etc., that may be part of the user interface 104 and that may be associated with the interface element in a manner in which manipulation of the interface element causes the performance of operations according to the manipulation of the interface element.

In some embodiments, the user interface 104 may include a first interface element configured to receive a first user input regarding a degree of stereoscopic depth rendered in the stereoscopic images 108. The first interface element may be configured to direct adjustment of the stereoscopic depth based on the first user input such that the stereoscopic images 108 have a stereoscopic depth that is based on the adjustment of the stereoscopic depth.

Figure 2A:
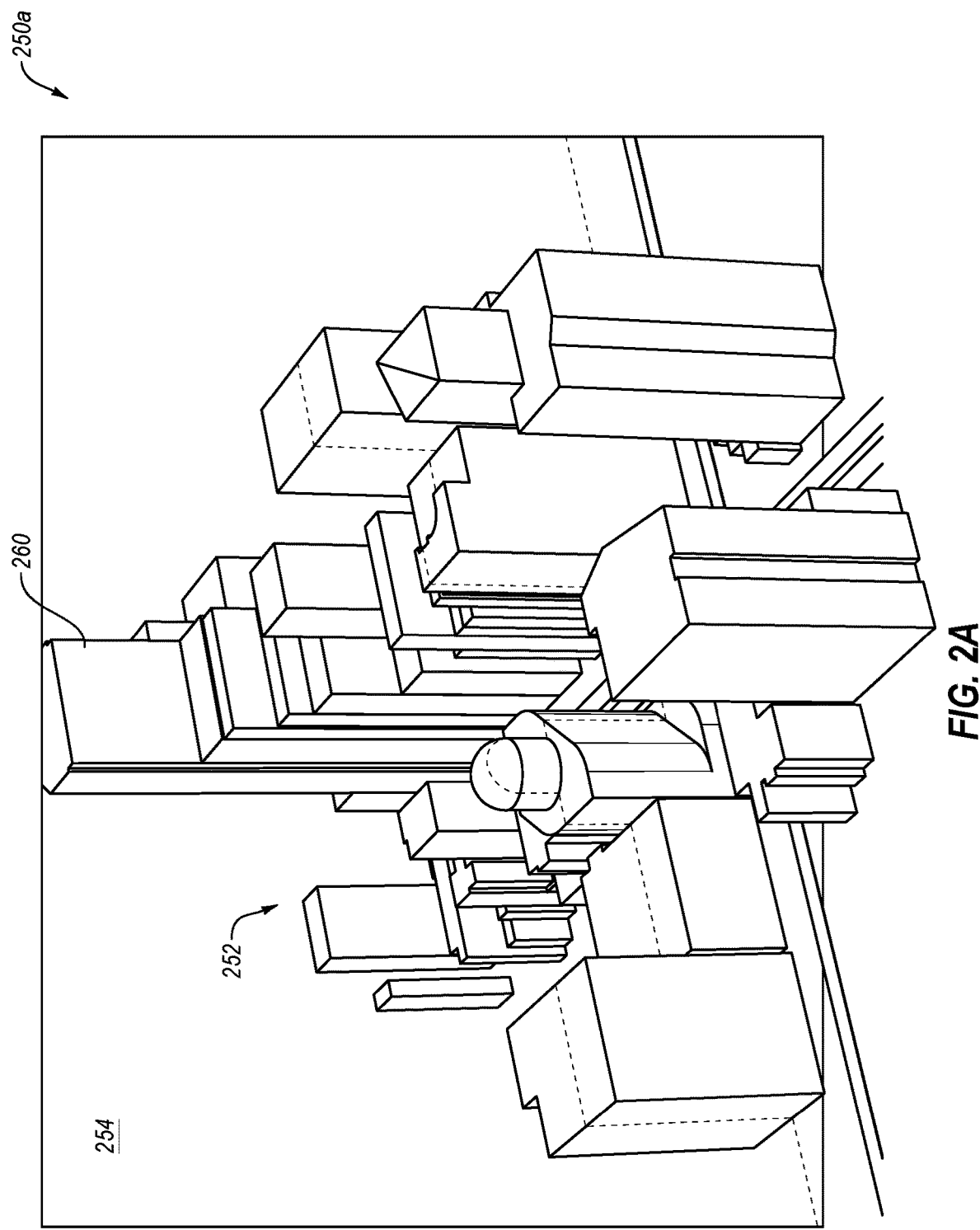
FIG. 2A illustrates a stereoscopic depiction of a setting that corresponds to a first stereoscopic image and that is displayed on a display screen.
Figure 2B:
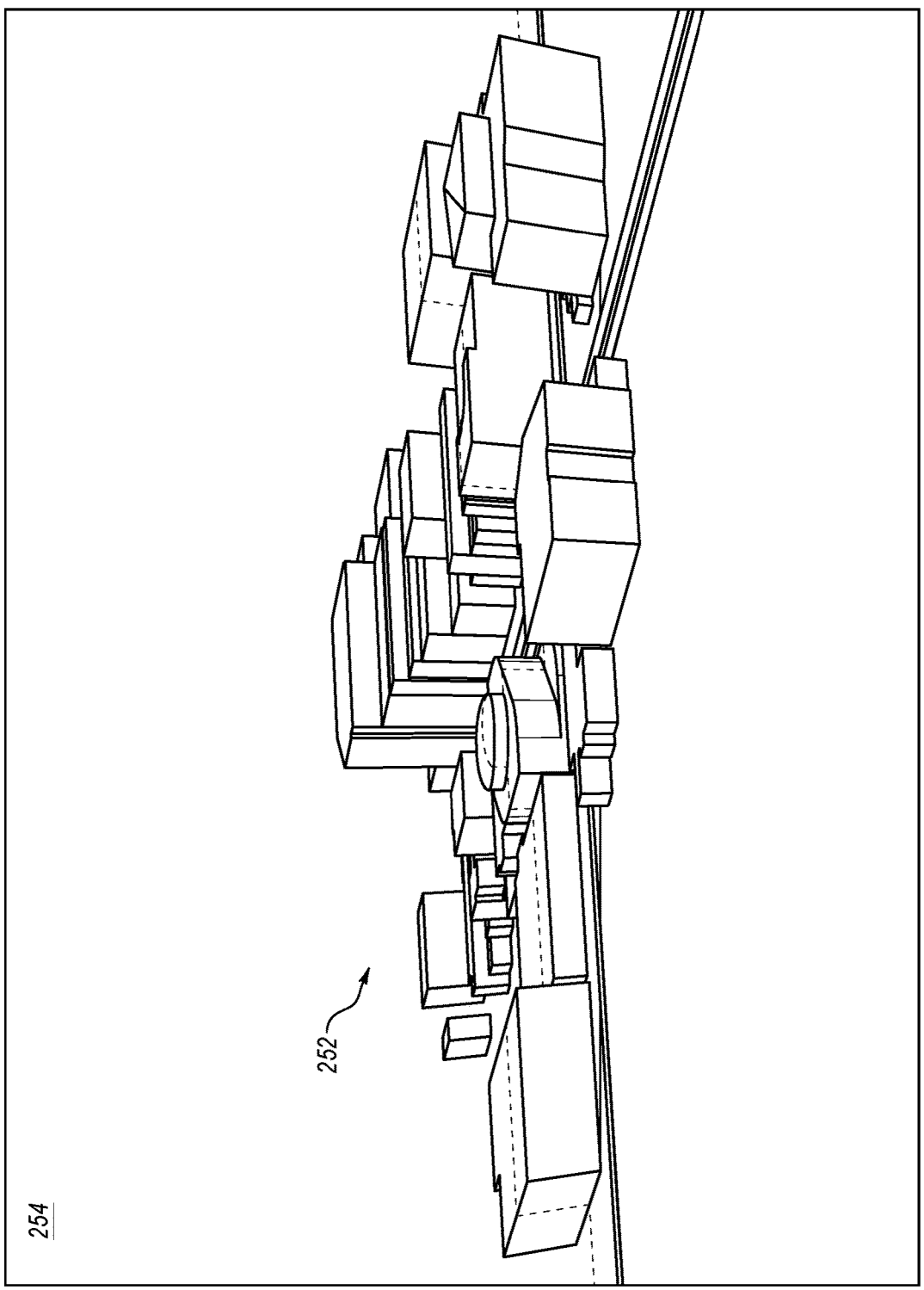
FIG. 2B illustrates a stereoscopic depiction of the setting of FIG. 2A that corresponds to a second stereoscopic image and that is displayed on a display screen.

Adjustment of the stereoscopic depth may include adjustment of a degree of stereoscopic effect that may be provided by the stereoscopic images 108. For example, FIG. 2A illustrates a stereoscopic depiction 250a of a setting 252 that corresponds to a first stereoscopic image and that is displayed on a display screen 254. Additionally, FIG. 2B illustrates a stereoscopic depiction 250b of the setting 252 that corresponds to a second stereoscopic image and that is displayed on the display screen 254. As illustrated by a comparison between FIGS. 2A and 2B, the first stereoscopic image and the second stereoscopic image may have different degrees of stereoscopic depth that may be based on different settings of the first interface element as adjusted based on the user input 102.

As another example, the user interface 104 may include a second interface element configured to receive a second user input regarding adjustment of a z-plane position of the stereoscopic images 108. The second interface element may be configured to direct adjustment of the z-plane position based on the second user input such that a z-plane of the stereoscopic images 108 may have a position that is based on the adjustment of the z-plane.

Adjustment of the z-plane may include an adjustment of a position of the setting depicted by the stereoscopic images 108 with respect to a screen that displays the stereoscopic images 108 such that a relative position of the stereoscopic effect of the stereoscopic images 108 with respect to the screen may be adjusted. For example, an adjustment of the z-plane may adjust how much of the stereoscopic effect is projected outside of the screen or behind the screen.

Figure 2C:
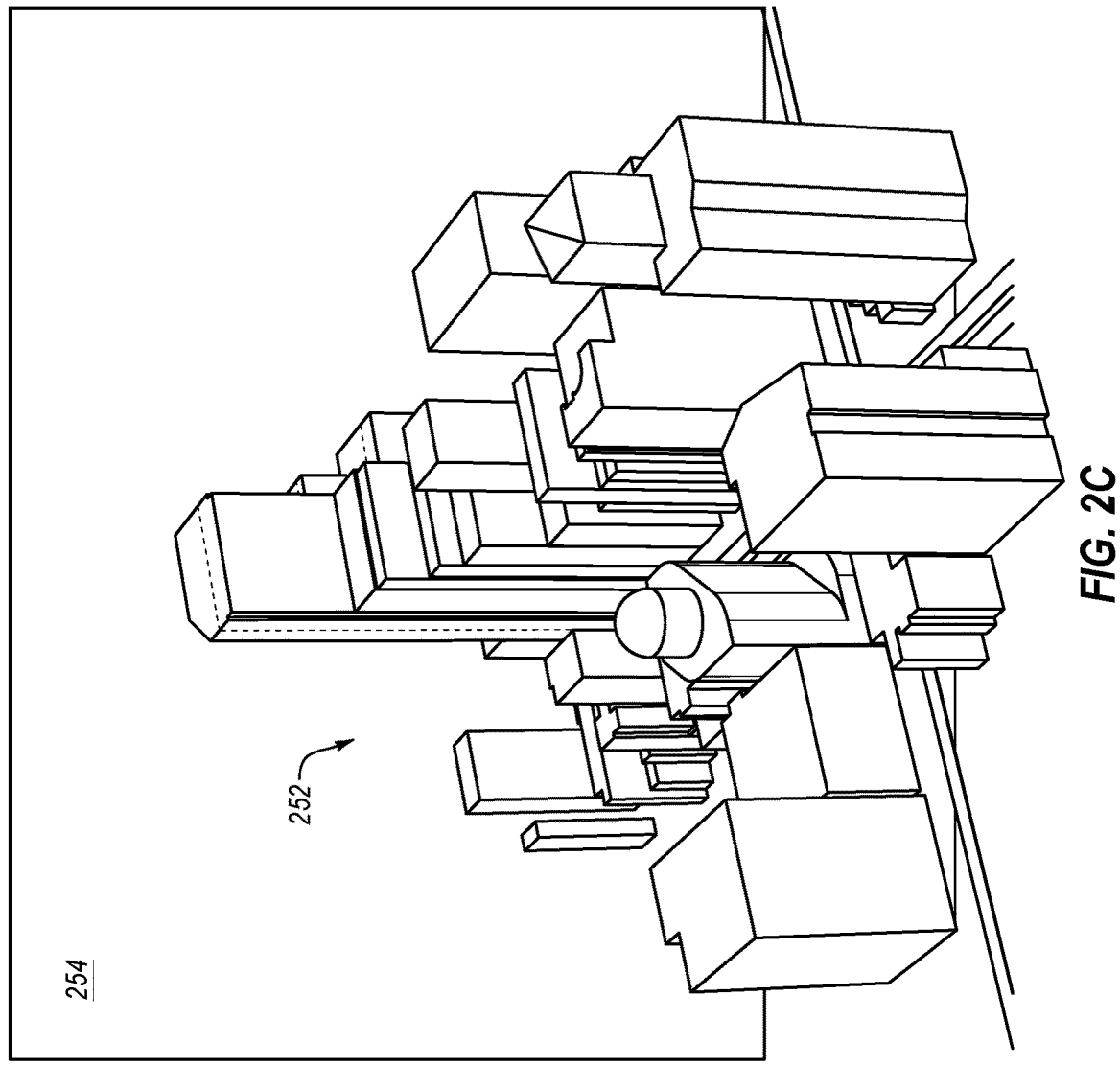
FIG. 2C illustrates a stereoscopic depiction of the setting of FIG. 2A that corresponds to a third stereoscopic image and that is displayed on a display screen.

For instance, FIG. 2C illustrates a stereoscopic depiction 250c of the setting 252 that corresponds to a third stereoscopic image and that is displayed on the display screen 254. As illustrated in FIG. 2A, the first stereoscopic image may have a first z-plane position in which most of the stereoscopic effect is inside of the screen 254. In contrast, as illustrated in FIG. 2C, the third stereoscopic image may have a third z-plane position in which most of the stereoscopic effect is outside of the display screen 254. The different z-plane positions may be based on different settings of the second interface element as adjusted based on the user input 102.

As another example, the user interface 104 may include a third interface element configured to receive a third user input regarding a size of a field of view of the setting depicted in the stereoscopic images 108. The third interface element may be configured to direct adjustment of the size of the field of view based on the third user input such that a field of view of the setting depicted in the stereoscopic images 108 may be based on the adjustment of the field of view.

Adjustment of the field of view may include an adjustment of how much of the setting may be depicted in the stereoscopic images 108 such that an amount of the setting included in the stereoscopic images 108 may be adjusted. The adjustment may include an adjustment to a horizontal field of view, a vertical field of view, or a combination of the horizontal or vertical field of view.

Figure 2D:
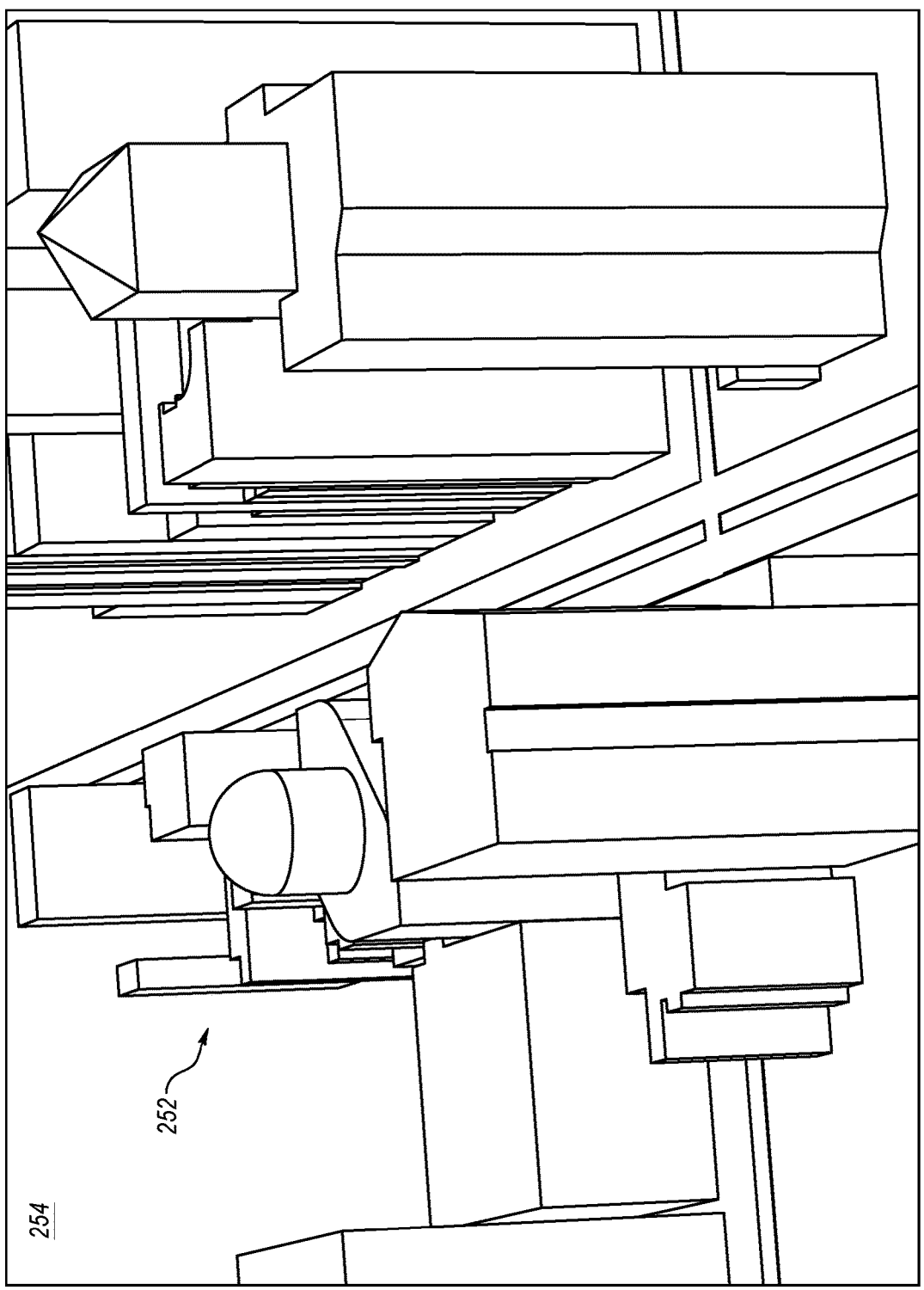
FIG. 2D illustrates a stereoscopic depiction of the setting of FIG. 2A that corresponds to a fourth stereoscopic image and that is displayed on a display screen.

For instance, FIG. 2D illustrates a stereoscopic depiction 250d of the setting 252 that corresponds to a fourth stereoscopic image and that is displayed on the display screen 254. As illustrated by a comparison between FIGS. 2A and 2D, the first stereoscopic image may have a wider field of view than the fourth stereoscopic image that may be based on different settings of the third interface element as adjusted based on the user input 102.

As another example, the user interface 104 may include a fourth interface element configured to receive a fourth user input regarding a pitch of the depiction of the setting depicted in the stereoscopic images 108. The fourth interface element may be configured to direct adjustment of the pitch based on the fourth user input such that the pitch of the depiction of the setting in the stereoscopic images 108 may be based on the adjustment of the pitch.

Adjustment of the pitch may include an adjustment of a viewing angle from which the setting may be observed as depicted in the stereoscopic images 108. For example, the pitch may be adjusted to view the setting directly from above, at a 45° angle, at ground level, or any angle in between.

Figure 2E:
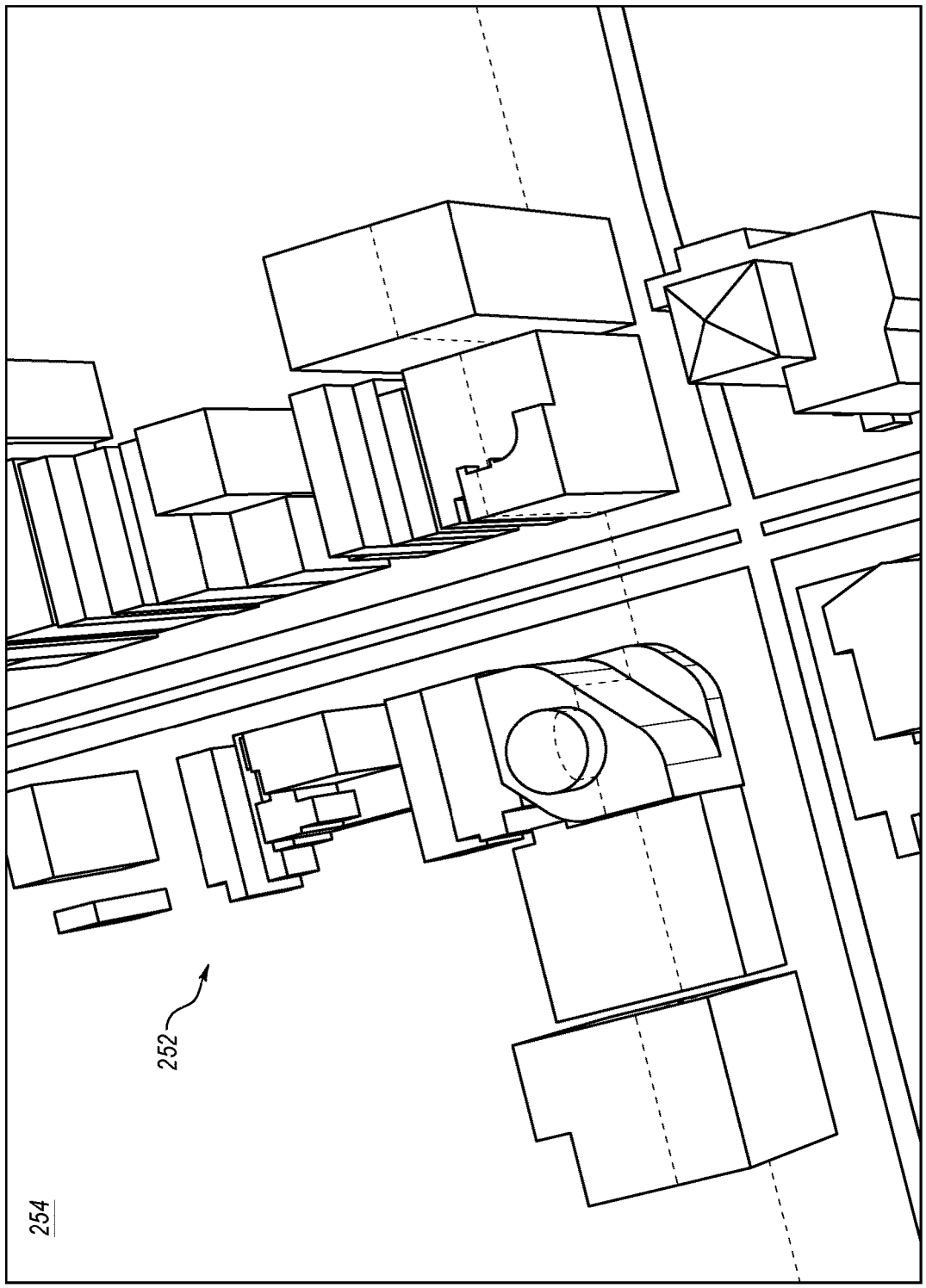
FIG. 2E illustrates a stereoscopic depiction of the setting of FIG. 2A that corresponds to a fifth stereoscopic image and that is displayed on a display screen.

For instance, FIG. 2E illustrates a stereoscopic depiction 250e of the setting 252 that corresponds to a fifth stereoscopic image and that is displayed on the display screen 254. As illustrated in FIG. 2A, the setting 252 may be depicted in the first stereoscopic image based on a first viewing angle. Additionally, as illustrated in FIG. 2E, the setting 252 may be depicted in the fifth stereoscopic image based on a fifth viewing angle that is different from the first viewing angle. The different viewing angles may be based on different settings of the fourth interface element as adjusted based on the user input 102.

As another example, the user interface 104 may include a fifth interface element configured to receive a fifth user input regarding a distance of a point of view from which the setting depicted in the stereoscopic images 108 is depicted. The fifth interface element may be configured to direct adjustment of the distance based on the fifth user input such that the distance of the point of view in the stereoscopic images 108 may be based on the adjustment of the distance.

Adjustment of the distance may include an adjustment of how far away the point of view from which the setting is being viewed is from the setting. For example, in some embodiments, an adjustment of the distance may include an adjustment of an altitude from which a geographic setting may be viewed as depicted by the stereoscopic images 108.

Figure 2F:
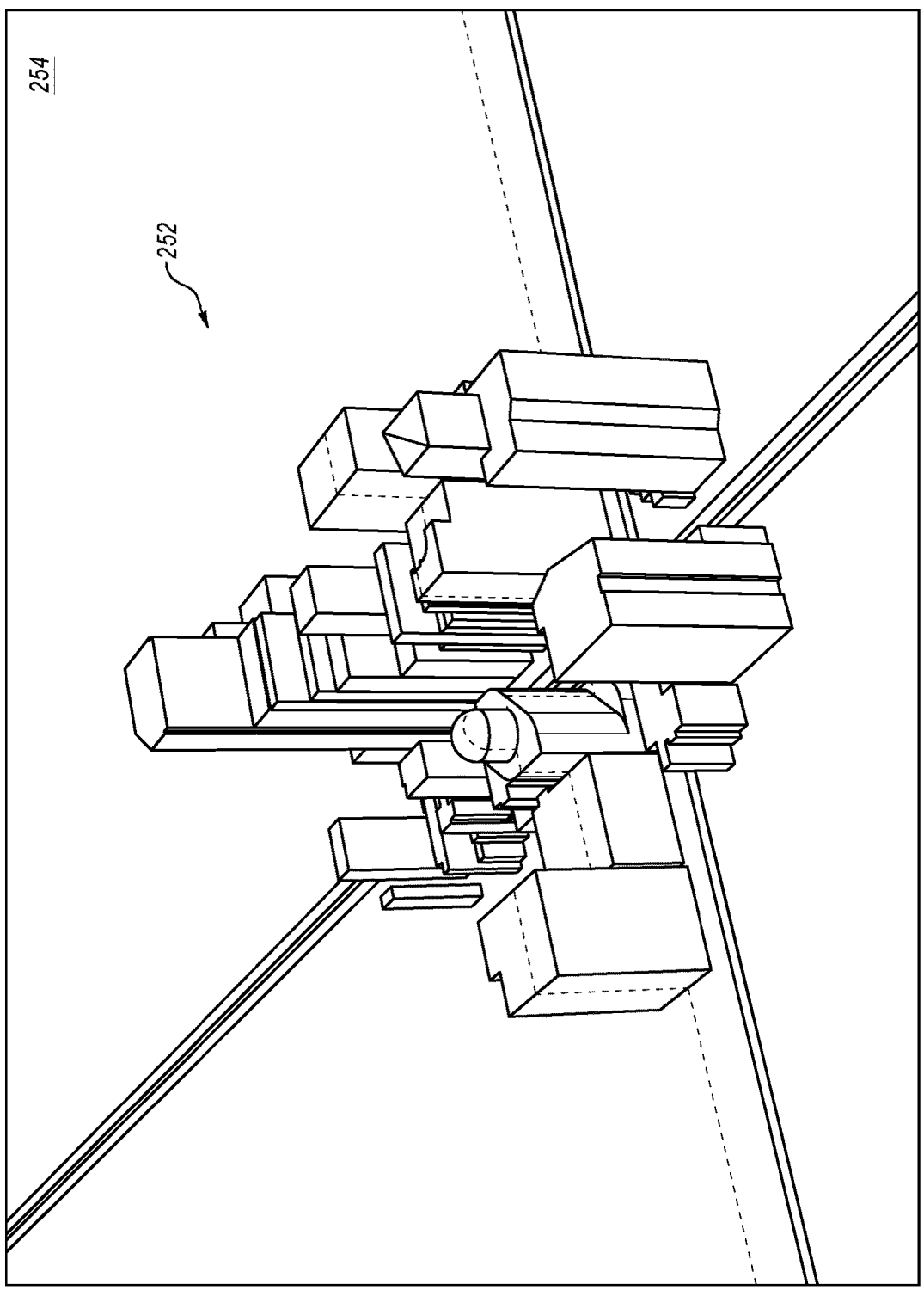
FIG. 2F illustrates a stereoscopic depiction of the setting of FIG. 2A that corresponds to a sixth stereoscopic image and that is displayed on a display screen.

For instance, FIG. 2F illustrates a stereoscopic depiction 250f of the setting 252 that corresponds to a sixth stereoscopic image and that is displayed on the display screen 254. As illustrated in FIG. 2A, the setting 252 may be depicted in the first stereoscopic image based on the point of view being from a first aerial distance from the ground. Additionally, as illustrated in FIG. 2F, the setting 252 may be depicted in the sixth stereoscopic image based on the point of view being from a second aerial distance from the ground that is higher than the first aerial distance. The different distances may be based on different settings of the fifth interface element as adjusted based on the user input 102.

As another example, the user interface 104 may include a sixth interface element configured to receive a sixth user input regarding a scaling of objects that may be depicted in the stereoscopic images 108. The sixth interface element may be configured to direct adjustment of the scaling such that scaling of objects depicted in the stereoscopic images 108 may be based on the adjustment of the scaling.

Adjustment of the scaling may include an adjustment of a size of objects that may be depicted in the stereoscopic images 108. For example, the setting may include multiple buildings that may have different heights. In some instances, one or more of the buildings may be so tall that a depiction of the height of all the buildings to scale in a 3D rendering of the setting via the stereoscopic images 108 may obstruct a view of the setting. Adjustment of the scaling may adjust the scaling of the taller objects such that their depicted heights may be reduced as compared to other objects to reduce obstruction of the view.

For instance, FIG. 2G illustrates a stereoscopic depiction 250g of the setting 252 that corresponds to a seventh stereoscopic image and that is displayed on the display screen 254. As illustrated in FIG. 2A, the setting 252 may include a building 260 that is taller than the other buildings. As illustrated in FIG. 2G, the height of the building 260 may be reduced. The different heights may be based on whether the scaling function is enabled or disabled based on the user input 102.

As mentioned above, in some embodiments, the user interface 104 may be included with any suitable system that may generate the stereoscopic images 108. In these or other embodiments, the stereoscopic images 108 may depict a geographic setting such as for instance with respect to a mapping application. Additionally or alternatively, the user interface 104 may include one or more interface elements that may be used with respect to depiction of a geographic setting.

For example, in some embodiments, a mapping application may be configured to simulate driving along a particular navigation route. In these or other embodiments, the user interface 104 may include a seventh interface element configured to receive a seventh user input regarding a speed of the simulation of following the navigation route. The seventh interface element may be configured to direct adjustment of the speed such that the driving speed of the simulation as depicted in the stereoscopic images 108 may be based on the adjustment of the speed.

In these or other embodiments, the mapping application (or any other applicable system that depicts a geographic setting) may be configured to simulate flying through the geographic setting. In these or other embodiments, the user interface 104 may include an eighth interface element configured to receive an eighth user input regarding a flight mode. The eighth interface element may be configured to direct enablement or disablement of the flight mode based on the eighth user input.

In these or other embodiments, the mapping application (or any other applicable system that depicts a geographic setting) may be configured to generate the stereoscopic images 108 based on one or more images of the geographic setting that may be captured by one or more cameras such that the mapping application may depict a stereoscopic view of the geographic setting based on the images. Additionally or alternatively, the mapping application may be configured to generate the stereoscopic images 108 based on map drawings such that the mapping application may depict a drawn stereoscopic view of the geographic setting. In these or other embodiments, the user interface 104 may include a ninth interface element configured to receive a ninth user input regarding an air image mode or a map mode. The ninth interface element may be configured to direct enablement or disablement of the air image mode or the map mode based on the ninth user input.

As described above, the user interface 104 may thus be configured to control one or more parameters of the stereoscopic images 108 based on the user input 102 such that the stereoscopic images 108 may be custom generated.

Modifications, additions, or omissions may be made to FIGS. 1 and 2A-2G without departing from the scope of the present disclosure. For example, the number and type of interface elements included in the user interface 104 may vary. Additionally, although the terms "first," "second," "third," "fourth," etc. are used with respect to the interface elements, user inputs, etc., these terms do not necessarily connote a specific order or number of elements but are used merely to ease description. For example, in some embodiments, the user interface 104 may include the first interface element, the second interface element, and the fourth interface element but not the third interface element. In addition, the effects that are illustrated and described with respect to FIGS. 2A-2G are not necessarily to scale or actual depictions but are merely used to help improve understanding of the present disclosure. Moreover, although one or more features of the user interface 104 are described with respect to a mapping application, the user interface 104 is not limited only to mapping applications.

FIG. 3 illustrates an example visual depiction with respect to a screen 354 of a user interface 304 configured to control adjustment of a stereoscopic image. In some embodiments, the user interface 304 may be an example of the user interface 104 of FIG. 1. In the present example, the user interface 304 may correspond to a mapping application. However, one or more interface elements of the user interface 304 may be used in implementations that are not related to mapping applications.

In some embodiments, the user interface 304 may include an "Inocular Distance" (IOD) interface element that may correspond to the first interface element described above with respect to FIGS. 1, 2A, and 2B. As such, the IOD interface element may be configured to receive first user input regarding a degree of stereoscopic depth and may be configured to direct adjustment of the stereoscopic depth based on the first user input.

In the illustrated example, the IOD interface element may include an IOD element 362a and an IOD element 362b. The IOD element 362a may include a field where the user may enter a number, as the first user input via an input device, indicating the amount of stereoscopic depth. The IOD element 362b may include a slide bar with a slider that the user may move, as the first user input via an input device, to adjust the amount of stereoscopic depth. In some embodiments, the IOD interface element may be configured such that movement of the slider of the IOD element 362b may cause an automatic change to the value populated in the field of the IOD element 362a that corresponds to the location of the slider. Additionally or alternatively, the IOD interface element may be configured such that a change in the value in the field of the IOD element 362a may cause movement of the slider of the IOD element 362b to a position that corresponds to the value in the field.

The illustrated embodiment of the IOD interface element is merely an example. For example, in some embodiments, the IOD interface element may include only the IOD element 362a or only the IOD element 362b. In these or other embodiments, the IOD interface element may include another type of interface element.

In some embodiments, the user interface 304 may include a "Screen Z" interface element that may correspond to the second interface element described above with respect to FIGS. 1, 2A, and 2C. As such, the Screen Z interface element may be configured to receive second user input regarding a z-plane position and may be configured to direct adjustment of the z-plane position based on the second user input.

In the illustrated example, the Screen Z interface element may include a Screen Z element 364a and a Screen Z element 364b. The Screen Z element 364a may include a field where the user may enter a number, as the second user input via an input device, indicating the position of the z-plane. The Screen Z element 364b may include a slide bar with a slider that the user may move, as the second user input via an input device, to adjust the position of the z-plane. In some embodiments, the Screen Z interface element may be configured such that movement of the slider of the Screen Z element 364b may cause an automatic change to the value populated in the field of the Screen Z element 364a that corresponds to the location of the slider. Additionally or alternatively, the Screen Z interface element may be configured such that a change in the value in the field of the Screen Z element 364a may cause movement of the slider of the Screen Z element 364b to a position that corresponds to the value in the field.

The illustrated embodiment of the Screen Z interface element is merely an example. For example, in some embodiments, the Screen Z interface element may include only the Screen Z element 364a or only the Screen Z element 364b. In these or other embodiments, the Screen Z interface element may include another type of interface element.

In some embodiments, the user interface 304 may include a "Field of View" (FOV) interface element that may correspond to the third interface element described above with respect to FIGS. 1, 2A, and 2D. As such, the FOV interface element may be configured to receive third user input regarding a size of a field of view and may be configured to direct adjustment of the field of view based on the third user input.

In the illustrated example, the FOV interface element may include an FOV element 360a and an FOV element 360b. The FOV element 360a may include a field where the user may enter a number, as the third user input via an input device, indicating the size of the field of view. The FOV element 360b may include a slide bar with a slider that the user may move, as the third user input via an input device, to adjust the size of the field of view. In some embodiments, the FOV interface element may be configured such that movement of the slider of the FOV element 360b may cause an automatic change to the value populated in the field of the FOV element 360a that corresponds to the location of the slider. Additionally or alternatively, the FOV interface element may be configured such that a change in the value in the field of the FOV element 360a may cause movement of the slider of the FOV element 360b to a position that corresponds to the value in the field.

The illustrated embodiment of the FOV interface element is merely an example. For example, in some embodiments, the FOV interface element may include only the FOV element 360a or only the FOV element 360b. In these or other embodiments, the FOV interface element may include another type of interface element.

In some embodiments, the user interface 304 may include a "Pitch" interface element that may correspond to the fourth interface element described above with respect to FIGS. 1, 2A, and 2E. As such, the Pitch interface element may be configured to receive fourth user input regarding a view angle and may be configured to direct adjustment of the view angle based on the fourth user input.

In the illustrated example, the Pitch interface element may include a Pitch element 366a and a Pitch element 366b. The Pitch element 366a may include a field where the user may enter a number, as the fourth user input via an input device, indicating the view angle. The Pitch element 366b may include a slide bar with a slider that the user may move, as the fourth user input via an input device, to adjust the view angle. In some embodiments, the Pitch interface element may be configured such that movement of the slider of the Pitch element 366b may cause an automatic change to the value populated in the field of the Pitch element 366a that corresponds to the location of the slider. Additionally or alternatively, the Pitch interface element may be configured such that a change in the value in the field of the Pitch element 366a may cause movement of the slider of the Pitch element 366b to a position that corresponds to the value in the field.

The illustrated embodiment of the Pitch interface element is merely an example. For example, in some embodiments, the Pitch interface element may include only the Pitch element 366a or only the Pitch element 366b. In these or other embodiments, the Pitch interface element may include another type of interface element.

In some embodiments, the user interface 304 may include a "Distance" interface element that may correspond to the fifth interface element described above with respect to FIGS. 1, 2A, and 2F. As such, the Distance interface element may be configured to receive fifth user input regarding a viewing distance and may be configured to direct adjustment of the viewing distance based on the fifth user input.

In the illustrated example, the Distance interface element may include a Distance element 368a and a Distance element 368b. The Distance element 368a may include a field where the user may enter a number, as the fifth user input via an input device, indicating the viewing distance. The Distance element 368b may include a slide bar with a slider that the user may move, as the fifth user input via an input device, to adjust the viewing distance. In some embodiments, the Distance interface element may be configured such that movement of the slider of the Distance element 368b may cause an automatic change to the value populated in the field of the Distance element 368a that corresponds to the location of the slider. Additionally or alternatively, the Distance interface element may be configured such that a change in the value in the field of the Distance element 368a may cause movement of the slider of the Distance element 368b to a position that corresponds to the value in the field.

The illustrated embodiment of the Distance interface element is merely an example. For example, in some embodiments, the Distance interface element may include only the Distance element 368a or only the Distance element 368b. In these or other embodiments, the Distance interface element may include another type of interface element.

In some embodiments, the user interface 304 may include a "Scaled" interface element 372 that may correspond to the sixth interface element described above with respect to FIGS. 1, 2A, and 2G. As such, the Scaled interface element may be configured to receive sixth user input regarding a scaling of objects and may be configured to direct adjustment of the scaling based on the sixth user input.

In the illustrated example, the Scaled interface element 372 may include a selection button that in response to being selected may toggle between scaling objects and not scaling objects. The illustrated embodiment of the Scaled interface element 372 is merely an example. For example, in some embodiments, the Scaled interface element may include a slide bar or a field that may allow the user to adjust an amount of scaling. In these or other embodiments, the Scaled interface element may include another type of interface element.

In some embodiments, the user interface 304 may include a "Speed" interface element that may correspond to the seventh interface element described above with respect to FIG. 1. As such, the Speed interface element may be configured to receive seventh user input regarding a speed of following a navigation route and may be configured to direct adjustment of the speed based on the seventh user input.

In the illustrated example, the Speed interface element may include a Speed element 370a and a Speed element 370b. The Speed element 370a may include a field where the user may enter a number, as the seventh user input via an input device, indicating the speed. The Speed element 370b may include a slide bar with a slider that the user may move, as the seventh user input via an input device, to adjust the speed. In some embodiments, the Speed interface element may be configured such that movement of the slider of the Speed element 370b may cause an automatic change to the value populated in the field of the Speed element 370a that corresponds to the location of the slider. Additionally or alternatively, the Speed interface element may be configured such that a change in the value in the field of the Speed element 370a may cause movement of the slider of the Speed element 370b to a position that corresponds to the value in the field.

The illustrated embodiment of the Speed interface element is merely an example. For example, in some embodiments, the Speed interface element may include only the Speed element 370a or only the Speed element 370b. In these or other embodiments, the Speed interface element may include another type of interface element.

In some embodiments, the user interface 304 may include a "Flight" interface element 380 that may correspond to the eight interface element described above with respect to FIG. 1. As such, the Flight interface element may be configured to receive eighth user input regarding enablement of a flight mode and may be configured to direct enablement or disablement of the flight mode based on the eighth user input.

In the illustrated example, the Flight interface element 380 may include a selection button that in response to being selected may toggle between enabling and disabling the flight mode. The illustrated embodiment of the Flight interface element 380 is merely an example. For example, the Flight interface element may include another type of interface element.

In some embodiments, the user interface 304 may include an "Air Image" interface element 378 that may correspond to the ninth interface element described above with respect to FIG. 1. As such, the Air Image interface element may be configured to receive ninth user input regarding enablement of an air image mode or a map mode and may be configured to direct enablement or disablement of the air image mode or the map mode based on the ninth user input.

In the illustrated example, the Air Image interface element 378 may include a selection button that in response to being selected may toggle between the air image mode and the map mode. The illustrated embodiment of the Air Image interface element 378 is merely an example. For example, the Flight interface element may include another type of interface element.

In some embodiments, the user interface 304 may include a "Reset Default" interface element 374 that may, in response to being selected, restore one or more of the above-mentioned parameters (e.g., FOV, IOD, Screen Z, Pitch, Distance, Speed, Scaled, Air Image, Flight, etc.) to a default setting. In the illustrated example, the Reset Default interface element 374 may include a selection button that in response to being selected may reset the defaults. The illustrated embodiment of the Reset Default interface element 374 is merely an example. For example, the Reset Default interface element may include another type of interface element.

In some embodiments, the user interface 304 may include an "OK" interface element 376 that may, in response to being selected, save the selected settings for the above-referenced parameters. Additionally or alternatively, the menu screen of the user interface 304 may be exited in response to selecting the OK interface element 376. In the illustrated example, the OK interface element 376 may include a selection button that in response to being selected may save the settings and may exit out of the menu. The illustrated embodiment of the OK interface element 376 is merely an example. For example, the OK interface element may include another type of interface element.

In some embodiments, the user interface 304 may include a "Cancel" interface element 382 that may, in response to being selected, cancel any changes that may have been made to the selected settings for the above-referenced parameters. Additionally or alternatively, the menu screen of the user interface 304 may be exited in response to selecting the Cancel interface element 382. In the illustrated example, the Cancel interface element 382 may include a selection button that in response to being selected may cancel any changes and may exit out of the menu. The illustrated embodiment of the Cancel interface element 382 is merely an example. For example, the Cancel interface element may include another type of interface element.

Modifications, additions, or omissions may be made to FIG. 3 without departing from the scope of the present disclosure. For example, the number and type of interface elements included in the user interface 304 may vary. Moreover, although one or more features of the user interface 304 are described with respect to a mapping application, the user interface 304 is not limited only to mapping applications.

Figure 4:
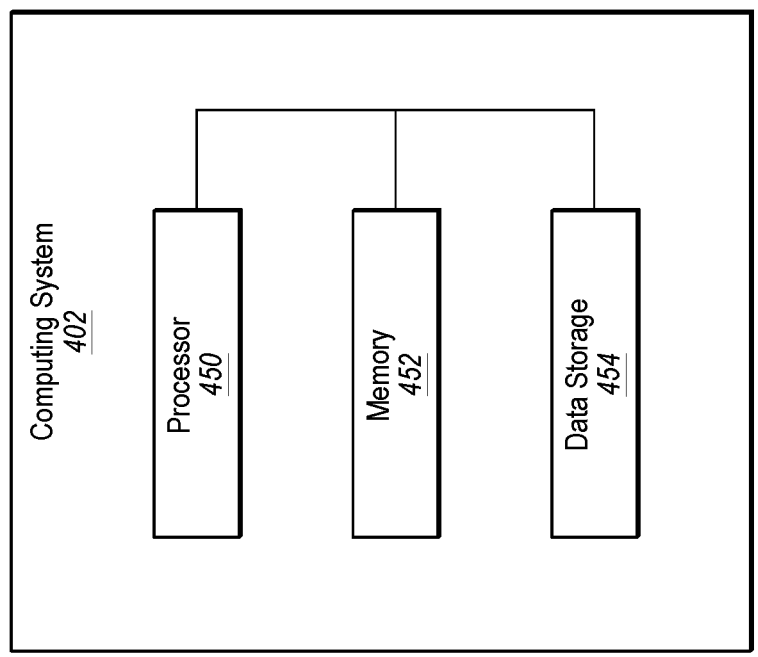
FIG. 4 illustrates an example computing system configured to perform operations related to controlling adjustment of a stereoscopic image.

FIG. 4 illustrates a block diagram of an example computing system 402, according to at least one embodiment of the present disclosure. The computing system 402 may be configured to implement one or more operations associated with a user interface configured to control adjustment of stereoscopic images (e.g., the user interfaces 104 and 304 of FIGS. 1 and 3). The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

For example, in some embodiments, program instructions related to deployment of the user interface may be included in the data storage 454. The processor 450 may fetch the program instructions of the user interface from the data storage 454 and may load the program instructions in the memory 452. After the program instructions of the user interface are loaded into memory 452, the processor 450 may execute the program instructions such that the computing system may implement the operations associated with the user interface as directed by the instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read Only Memory (ROM), Electrically Erasable Programmable Read Only Memory (EEPROM), Compact Disc Read Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Figure 5:
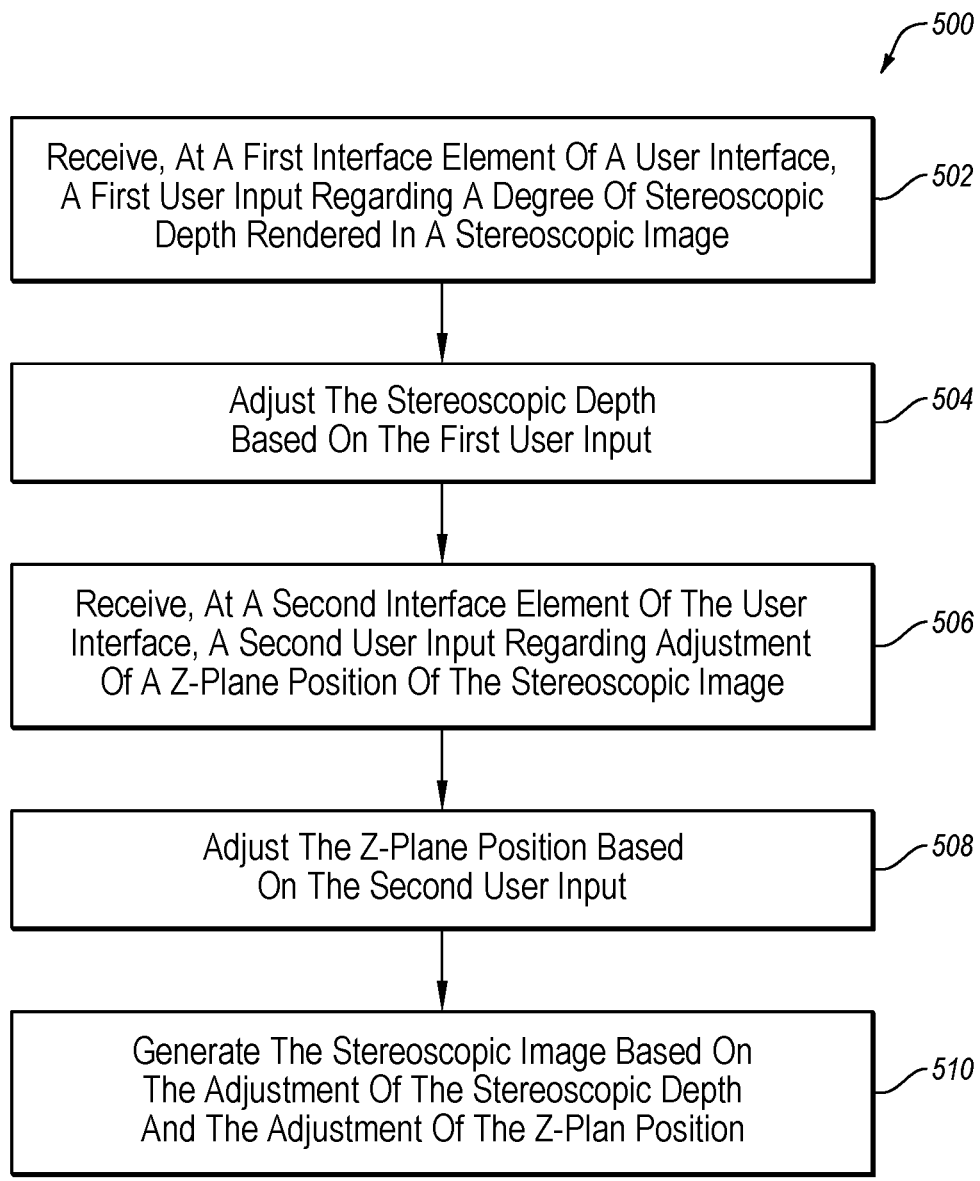
FIG. 5 is a flow-chart of an example computer-implemented method of controlling adjustment of a stereoscopic image.

FIG. 5 is a flow-chart of an example computer-implemented method 500 of controlling adjustment of a stereoscopic image, according to one or more embodiments of the present disclosure. One or more operations of the method 500 may be implemented, in some embodiments, by the user interface 104 or the user interface 304 of FIGS. 1 and 2. In these or other embodiments, the method 500 may be implemented by one or more components of a system that may be configured to control adjustment of a stereoscopic image, such as the computing system 402 of FIG. 4. Although illustrated as discrete blocks, various blocks may be divided into additional blocks, combined into fewer blocks, or eliminated, depending on the desired implementation.

The method 500 may begin at block 502 where a first user input regarding a degree of stereoscopic depth rendered in a stereoscopic image may be received. In some embodiments, the first user input may be received at a first interface element of the user interface. At block 504, the stereoscopic depth may be adjusted based on the first user input.

At block 506, a second user input regarding adjustment of a z-plane position of the stereoscopic image may be received. In some embodiments, the second user input may be received at a second interface element of the user interface. At block 508, the position of the z-plane may be adjusted based on the second user input.

At block 510, the stereoscopic image may be generated based on the adjustment of the stereoscopic depth and the adjustment of the z-plan position.

Therefore, the method 500 may be used to control adjustment of one a stereoscopic image according to one or more embodiments of the present disclosure. Modifications, additions, or omissions may be made to the method 500 without departing from the scope of the present disclosure. For example, the functions and/or operations described with respect to FIG. 5 may be implemented in differing order without departing from the scope of the present disclosure. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may include operations that include receiving, at a third interface element of the user interface, a third user input regarding a size of a field of view of a setting depicted in the stereoscopic image, adjusting the size of the field of view based on the third user input, and generating the stereoscopic image based on the adjustment of the size of the field of view. In these or other embodiments, the method 500 may include operations that include receiving, at a fourth interface element of the user interface, a fourth user input regarding a pitch of a depiction of a setting depicted in the stereoscopic image, adjusting the pitch based on the fourth user input, and generating the stereoscopic image based on the adjustment of the pitch. Additionally or alternatively, the method 500 may include operations that include receiving, at a fifth interface element of the user interface, a fifth user input regarding a distance of a point of view from which a setting depicted in the stereoscopic image is depicted, adjusting the distance based on the fifth user input, and generating the stereoscopic image based on the adjustment of the distance. In these or other embodiments, the method 500 may include operations that include receiving, at a sixth interface element of the user interface, a sixth user input regarding a scaling of objects of the setting as depicted in the stereoscopic image, adjusting the scaling based on the third user input, and generating the stereoscopic image based on the adjustment of the scaling.

Additionally or alternatively, the setting may be a geographic setting and the stereoscopic image may be one of multiple stereoscopic images of the geographic setting that are used in a mapping application. In these or other embodiments, the method 500 may include operations that include receiving, at a seventh interface element of the user interface, a seventh user input regarding a speed of a simulation of following a navigation route within the geographic setting as presented in the plurality of stereoscopic images, and adjusting the speed based on the third user input; and simulating the following of the navigation route within the geographic setting based on the adjusted speed. In these or other embodiments, the method 500 may include operations that include receiving, at an eighth interface element of the user interface, an eighth user input regarding a flight mode of the mapping application that simulates flying above the ground of the geographic setting as presented in the plurality of stereoscopic images, and enabling the flight mode based on the eighth user input. Additionally or alternatively, the method 500 may include operations that include receiving, at a ninth interface element of the user interface, a ninth user input regarding an air image mode of the mapping application that depicts a stereoscopic view of the geographic setting based on one or more images of the geographic setting captured by a camera, and enabling the air image mode based on the ninth user input.

As indicated above, the embodiments described in the present disclosure may include the use of a special purpose or general purpose computer (e.g., the processor 450 of FIG. 4) including various computer hardware or software modules, as discussed in greater detail below. Further, as indicated above, embodiments described in the present disclosure may be implemented using computer-readable media (e.g., the memory 452 of FIG. 4) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, as indicated above, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

In addition, in the appended claims, the term "non-transitory computer-readable storage media" is used. The term "non-transitory" should be construed to exclude only those types of transitory media that were found to fall outside the scope of patentable subject matter in the Federal Circuit decision of In re Nuijten, 500 F.3d 1346 (Fed. Cir. 2007).

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An electronics device comprising:
  a display device adapted to display:
    a user interface configured to control adjustment of a stereoscopic image, the user interface comprising:
      a first interface element configured to:
        receive a first user input regarding a degree of stereoscopic depth rendered in a stereoscopic image; and
        direct adjustment of the stereoscopic depth based on the first user input; and
      a second interface element configured to:
        receive a second user input regarding adjustment of a z-plane position of the stereoscopic image; and
        direct adjustment of the z-plane position based on the second user input.

2. The electronics device of claim 1, the user interface comprising:
  a third interface element configured to:
    receive a third user input regarding a size of a field of view of a setting depicted in the stereoscopic image; and
    direct adjustment of the size of the field of view based on the third user input.

3. The electronics device of claim 1, the user interface comprising:
  a third interface element configured to:
    receive a third user input regarding a pitch of a depiction of a setting depicted in the stereoscopic image; and
    direct adjustment of the pitch based on the third user input.

4. The electronics device of claim 1, the user interface comprising:
  a third interface element configured to:
    receive a third user input regarding a distance of a point of view from which a setting depicted in the stereoscopic image is depicted; and
    direct adjustment of the distance based on the third user input.

5. The electronics device of claim 2, the user interface comprising:
  a third interface element configured to:
    receive a third user input regarding a scaling of objects of a setting as depicted in the stereoscopic image; and
    direct adjustment of the scaling based on the third user input.

6. The electronics device of claim 1, wherein:
  the stereoscopic image depict a geographic setting; and
  the stereoscopic image is one of a plurality of stereoscopic images of the geographic setting that are used in a mapping application.

7. The electronics device of claim 6, the user interface comprising:
a third interface element configured to:
receive a third user input regarding a speed of a simulation of following a navigation route within the geographic setting as presented in the plurality of stereoscopic images; and
direct adjustment of the speed based on the third user input.

8. The electronics device of claim 6, the user interface comprising:
a third interface element configured to:
receive a third user input regarding a flight mode of the mapping application that simulates flying above the ground of the geographic setting as presented in the plurality of stereoscopic images; and
direct enablement of the flight mode based on the third user input.

9. The electronics device of claim 6, the user interface comprising:
a third interface element configured to:
receive a third user input regarding an air image mode of the mapping application that depicts a stereoscopic view of the geographic setting based on one or more images of the geographic setting captured by a camera; and
direct enablement of the air image mode based on the third user input.

10. A method comprising:
receiving, at a first interface element of a user interface, a first user input regarding a degree of stereoscopic depth rendered in a stereoscopic image;
adjusting the stereoscopic depth based on the first user input;
receiving, at a second interface element of the user interface, a second user input regarding adjustment of a z-plane position of the stereoscopic image;
adjusting the z-plane position based on the second user input; and
generating the stereoscopic image based on the adjustment of the stereoscopic depth and the adjustment of the z-plane position.

11. The method of claim 10, further comprising:
receiving, at a third interface element of the user interface, a third user input regarding a size of a field of view of a setting depicted in the stereoscopic image;
adjusting the size of the field of view based on the third user input; and
generating the stereoscopic image based on the adjustment of the size of the field of view.

12. The method of claim 10, further comprising:
receiving, at a third interface element of the user interface, a third user input regarding a pitch of a depiction of a setting depicted in the stereoscopic image;
adjusting the pitch based on the third user input; and
generating the stereoscopic image based on the adjustment of the pitch.

13. The method of claim 10, further comprising:
receiving, at a third interface element of the user interface, a third user input regarding a distance of a point of view from which a setting depicted in the stereoscopic image is depicted;
adjusting the distance based on the third user input; and
generating the stereoscopic image based on the adjustment of the distance.

14. The method of claim 10, further comprising:
receiving, at a third interface element of the user interface, a third user input regarding a scaling of objects of a setting as depicted in the stereoscopic image;
adjusting the scaling based on the third user input; and
generating the stereoscopic image based on the adjustment of the scaling.

15. The method of claim 14, wherein the setting is a geographic setting and the stereoscopic image is one of a plurality of stereoscopic images of the geographic setting that are used in a mapping application.

16. The method of claim 15, further comprising:
receiving, at a third interface element of the user interface, a third user input regarding a speed of a simulation of following a navigation route within the geographic setting as presented in the plurality of stereoscopic images;
adjusting the speed based on the third user input; and
simulating the following of the navigation route within the geographic setting based on the adjusted speed.

17. The method of claim 15, further comprising:
receiving, at a third interface element of the user interface, a third user input regarding a flight mode of the mapping application that simulates flying above the ground of the geographic setting as presented in the plurality of stereoscopic images; and
enabling the flight mode based on the third user input.

18. The method of claim 15, further comprising:
receiving, at a third interface element of the user interface, a third user input regarding an air image mode of the mapping application that depicts a stereoscopic view of the geographic setting based on one or more images of the geographic setting captured by a camera; and
enabling the air image mode based on the third user input.

19. A system comprising:
one or more non-transitory computer-readable storage media having instructions stored thereon; and
one or more processors communicatively coupled to the one or more computer-readable storage media and configured to, in response to executing the instructions, cause the performance of operations, the operations comprising:
receiving, at a first interface element of a user interface, a first user input regarding a degree of stereoscopic depth rendered in a stereoscopic image;
adjusting the stereoscopic depth based on the first user input;
receiving, at a second interface element of the user interface, a second user input regarding adjustment of a z-plane position of the stereoscopic image;
adjusting the z-plane position based on the second user input; and
generating the stereoscopic image based on the adjustment of the stereoscopic depth and the adjustment of the z-plane position.

20. The system of claim 19, wherein:
the stereoscopic image depicts a geographic setting; and
the stereoscopic image is one of a plurality of stereoscopic images of the geographic setting that are used in a mapping application.

* * * * *